Patented July 1, 1941

2,247,772

UNITED STATES PATENT OFFICE 2,247,772

PHENOL-FORMALDEHYDE RESINOUS COMPOSITION

Gaetano F. D'Alelio, Pittsfield, Mass., assignor to General Electric Company, a corporation of New York No Drawing. Application August 23, 1938, Serial No. 226,273

7 Claims. (Cl. 260—45)

This invention relates to resinous compositions and to their production, particularly to cast phenolic resins. While cast phenolic resins have been known for a long time, satisfactory resins have been obtained only when the reaction between the phenol and formaldehyde was carried out in a process involving more than one chemical stage. As a rule, the phenol and formaldehyde are reacted in the presence of alkaline catalysts to some definite point of condensation which is then followed by an acidification process before or during the dehydration. The resulting resin is then poured into molds and hardened under the influence of heat. The nature of the acid used for acidification has been claimed to be the determining factor as to whether the final product was opaque or glass clear and that glass clear products could not be obtained, however thorough the removal of water, if the proper acid was not chosen.

The present invention permits the preparation of a phenolic casting resin in a one-stage process. In accordance with the present invention the phenol and formaldehyde and catalysts are added in one step and carried through the condensation stage and dehydration stage without the necessary addition of another chemical reagent thereby preparing useful products which may be either opaque or glass clear. With care and the choice of raw materials almost water white products may be obtained.

The process depends on the nature of the catalyst which essentially is an amphoteric substance possessing both a positive and a negative charge and a zero potential. An example of this type of compound is glycine which is known as amino acetic acid and has the formula $NH_2CH_2COOH$. As is noted it possesses a basic or $NH_2$ end and an acid or COOH end. It will not migrate at a definite pH to either a positive or negative electrode though its ionic form possesses both a negative and positive charge, $NH_3^+CH_2COO^-$. An amphoteric substance such as glycine may be reacted with alkalies to give a product which is alkaline due to the $NH_2$ group which is freed from the influence of the COOH group now neutralized thus, $NH_2CH_2COONa$, or with acids to give acidic molecules

However, glycine shows another behavior in that it reacts with formaldehyde on the $NH_2$ end to remove the basicity of that end,

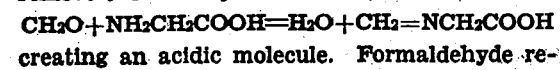

creating an acidic molecule. Formaldehyde reacts with salts of amphoteric substances, for example sodium glycinate, to give neutral molecules. This is true to such an extent that glycine may be titrated quantitatively with alkalies in the presence of formaldehyde, a determination which is otherwise impossible if the formaldehyde is omitted.

I have discovered that a mixture of an amino carboxylic acid and a salt of such acid wherein the amino group is reactable with an aldehyde permits the condensation of phenol and formaldehyde to proceed as though it were an alkaline condensation and to harden or cure as if it were in an acidic condition, a result which would not ordinarily be expected when a phenol-formaldehyde condensation is carried out under initially strong alkaline conditions.

Phenol and formaldehyde in earlier processes have been condensed under the influence of condensation agents having a basic reaction throughout but the final products contained inherent defects in that they were brittle, making machining difficult, and were dark in color. Again, if too high a molar ratio of formaldehyde was condensed with phenol, then there existed a serious difficulty in the isolation of the resin, since the resin would be likely, in the process of dehydration, to harden so that it could not be poured into molds to be cast. These difficulties were eliminated by acidification of the alkali to neutrality or even to a definitely acid condition, for example a pH of about 5.6.

In this invention by adjusting the ratio of an amphoteric substance reactable with formaldehyde and one of its salts, also reactable with formaldehyde, and by using this adjusted ratio as catalysts, I am able not only to eliminate the defects inherent in an alkaline phenol-formaldehyde casting resin but to eliminate also the added step of acidification; for example, a resin prepared from phenol and formaldehyde catalyzed by glycine-sodium glycinate catalyst can, when hardened, be machined, while a resin catalyzed by a straight alkaline catalyst molecularly equivalent to the sodium glycinate cannot be worked. In this case one mol of sodium glycinate (97 gm.) would be the molecular equivalent of 40 gm. of sodium hydroxide.

The reactions described for glycine are common to all amino carboxylic acids such as tyrosine, alanine, serine, cystein, valine, lysine, p-amino benzoic acid, glutamic acid, etc., all of which acids are free from polypeptide linkages and may be used instead of glycine. Again the invention is not limited to the sodium salt of glycine or other amphoteric substance since only the neutralization of the COOH end is desired and potassium, lithium, ammonia or amines may be used with definite choices made because of the ionization value of the salt obtained.

Glycine, without glycinate, was found to be a catalyst for the phenol-formaldehyde condensation requiring, however, longer reflux time as well as an extended hardening time. The resin obtained had good properties.

By phenol is meant $C_6H_5OH$ and its homologues, particularly meta cresol. The per cent of total catalyst as well as the glycine-glycinate ratio determines the length of condensation time required, which time is likewise determined by the temperature of condensation. The formation of phases in the preparation of the resin again depends on the catalyst concentration as well as the ratio of glycine to glycinate, the time and temperature of reflux. Excellent castings were obtained by the dehydration of the resin syrups which showed resin separation in a distinct phase as was evidenced by opalescence or by stratification, or from condensation products which showed no separation hot or cold, or from those which showed no separation when hot followed by separation when cold.

Castings can be made in which the formaldehyde-phenol ratio may be widely varied, e. g. 1.5:1 or 2.25:1, but I prefer the higher formaldehyde concentrations because of the added clarity, brilliancy and strength thereby imparted to the final product and because of better resin yields as based on the phenol. For some applications plasticizers may be added to the resin usually in the form of polyhydric alcohols soluble in the resin. As would be expected these plasticizers retard the rate of hardening somewhat. The plasticizers may be added before, during, or after condensation, or during or after dehydration.

The resin prepared by the process described in this invention is of such clarity and color that it permits dyeing and pigmentation and the preparation of mottles. The resin may be hardened in 100 to 200 hours depending on the formulation, time of reflux, completeness of dehydration, etc., as well as the temperature at which the hardening is carried out.

In some cases it may be advisable to add the catalyst in portions, or to first add the glycinate and then the glycine, or even to prepare the glycine-glycinate catalyst in the solution of phenol and formaldehyde.

The products obtained by the process described herein have a very low water absorption, good resistance to light and impact forces.

The following examples, illustrative of the invention, are given in parts by weight, and the formalin is a 37.1% solution of formaldehyde in water:

Example I

| | Parts |
|---|---|
| Redistilled phenol | 200 |
| Formalin | 427 | are mixed in a flask and to this is added a separate solution containing:

| | Parts |
|---|---|
| Glycine | 4.7 |
| Sodium hydroxide | 1.88 |
| in Water | 10.4 |

The whole solution is then refluxed at atmospheric pressure to a faint opalescence which usually requires about 315 minutes from which a resin may precipitate on cooling. The apparatus is now converted to a distillation system and subjected to vacuum, usually about 26.5" to 27". The time of dehydration and completeness of dehydration will depend on the vacuum obtained in the system, and the temperature to which the resin is carried in the dehydration, as apparent to those skilled in the art. Lower or higher vacuum may be used but at 26.5" it usually takes about 95 minutes to obtain satisfactory dehydration. To insure a uniform distribution of heat, the flask is usually surrounded by a liquid medium such as oil or glycerine, a factor easily accomplished industrially with steam-jacketed kettles. The resin described in this example is dehydrated to an internal resin temperature of 85° C. resulting in a very light pale yellow, acidic resin syrup which is cast into molds and cured at about 70–80° C. for about 5 days, at which time it will show an impact of about 1.4 ft. lbs. when approximately a ½" tube is broken in a Charpy test machine. The temperature at which this syrup is cast will determine the length of time required to harden it to a definite point, e. g. it would require longer curing time at 50° C. than at 70° C. At any definite temperature, the hardness of the cured piece will be proportional to the time of curing until the maximum hardness is reached.

As shown by this example, the phenol and formaldehyde are caused to react while admixed with a relatively small amount each of glycine and sodium hydroxide, the molar proportion of glycine exceeding the molar proportion of sodium hydroxide.

An equivalent molar weight of potassium hydroxide, for example, may be substituted for the sodium hydroxide used.

Example II

The formulation is the same as Example I except that after dehydration was complete, 10% of glycerine was stirred in the syrup and the resulting mixture cast at 70° C. At the end of 10 days, the cast sample, similar in all details to Example I with the exception of the glycerine, could not be broken on the first impact in a Charpy impact machine whose maximum reading showed an impact of 2 ft. lbs. determined as previously described. The sample was almost a pure water white in color.

Example III

Same formulation as Example I except that the dehydration was carried to 65° C. and when the resin was cast and cured, opaque, of an ivory nature, rather than glass clear, samples were obtained.

Example IV 200 parts phenol, 256 parts formalin, and a solution of 3.42 parts glycine and 1.37 parts NaOH in 7.6 parts water are mixed, refluxed for 270 minutes and treated as Example I. The dehydration is carried to 86–87° C. at 26.5" vacuum. The resin is a light yellow color and may be cast at 70° C. for 5 to 7 days showing opacity when hard.

Example V 200 parts phenol, 400 parts formalin, and a solution of 3.0 parts glycine and 1.6 parts NaOH in 20 parts water are refluxed for 150 minutes and then let stand for 15 hours at room temperature, during which time a precipitation of the resin occurs. Dehydration is carried out as in Example I and the resin cast at 70° C. to desired hardness.

Example VI 200 parts phenol, 200 parts formalin, and 2.25 parts glycine and 0.9 part NaOH in 10 parts water are refluxed 320 minutes and subjected to a regular dehydration.

Samples cured hard in 4 days at 70° C.

Example VII 100 parts phenol, 200 parts formalin, and 2.25 parts glycine with 1.5 parts NaOH in 10 parts water are refluxed 95 minutes followed by usual dehydration and cast in molds to cure under the influence of heat to the desired hardness.

From the foregoing description it will be seen that the present invention provides a one-stage process of preparing a casting resin which consists in reacting under heat to resin formation a phenol, a molecular excess of formaldehyde and a catalytic amount of a mixture of an amino carboxylic acid and an amino carboxylic compound obtained by neutralizing the —COOH grouping of an amino carboxylic acid with a base, the said amino carboxylic acid and amino carboxylic compound each being reactable with formaldehyde. The invention also provides new heat-hardenable resins or casting resins that result from this process, as well as products obtained by hardening or curing such resins under heat. As shown by the illustrative examples, a casting resin produced by reacting phenol and formaldehyde in the presence of a relatively small amount of glycine and an alkali-metal salt of glycine, specifically sodium glycinate, is typical of my new casting resins.

What I claim as new and desire to secure by Letters Patent of the United States, is:

1. A one-stage process of preparing a casting resin which consists in reacting under heat to resin formation a phenol, a molecular excess of formaldehyde and a catalytic amount of a mixture of an amino carboxylic acid and an amino carboxylic compound obtained by neutralizing the —COOH grouping of an amino carboxylic acid with a base, the said amino carboxylic acid and amino carboxylic compound each being reactable with formaldehyde.

2. A heat-hardenable resinous product obtained by the reaction of a phenol and formaldehyde in the presence of a catalytic amount of a mixture of an amino carboxylic acid and an amino carboxylic compound obtained by neutralizing the —COOH grouping of an amino carboxylic acid with a base, the said amino carboxylic acid and amino carboxylic compound each being reactable with formaldehyde.

3. A casting resin produced by reacting phenol and formaldehyde in the presence of an alkali-metal glycine and a relatively small amount of a mixture of salt of glycine.

4. A casting resin produced by reacting phenol, formaldehyde, and a relatively small amount of a mixture of glycine and sodium glycinate.

5. The product obtained by hardening under heat the resinous product of claim 2.

6. The product obtained by hardening under heat the resinous product of claim 4.

7. A resin obtained by reaction of phenol and formaldehyde in the ratio of one mol of the former to from 1.5 to 2.25 mols of the latter, said ingredients being caused to react while admixed with a relatively small amount each of glycine and sodium hydroxide, the molar proportion of glycine exceeding the molar proportion of sodium hydroxide.

GAETANO F. D'ALELIO.

CERTIFICATE OF CORRECTION.

Patent No. 2,247,772. July 1, 1941.

GAETANO F. D'ALELIO.

It is hereby certified that error appears in the printed specification of the above numbered patent requiring correction as follows: Page 3, second column, lines 21, 22 and 23, claim 3, for the words "an alkali-metal glycine and a relatively small amount of a mixture of" read --a relatively small amount of a mixture of glycine and an alkali-metal--; and that the said Letters Patent should be read with this correction therein that the same may conform to the record of the case in the Patent Office.

Signed and sealed this 19th day of August, A. D. 1941.

(Seal)

Henry Van Arsdale,
Acting Commissioner of Patents.